United States Patent
Corbea et al.

(10) Patent No.: US 8,521,783 B2
(45) Date of Patent: *Aug. 27, 2013

(54) HIGHLY RELIABLE AND SCALABLE ARCHITECTURE FOR DATA CENTERS

(75) Inventors: Cosmin A. Corbea, Bellevue, WA (US); R. Donald Thompson, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/593,384

(22) Filed: Aug. 23, 2012

(65) Prior Publication Data

US 2012/0317583 A1    Dec. 13, 2012

Related U.S. Application Data

(63) Continuation of application No. 10/856,498, filed on May 28, 2004, now Pat. No. 8,255,422.

(51) Int. Cl.
*G06F 7/00* (2006.01)
*G06F 9/46* (2006.01)

(52) U.S. Cl.
USPC ........................................ 707/793; 718/102

(58) Field of Classification Search
USPC  707/792, 793, 999.1–999.104; 718/102–107
See application file for complete search history.

(56) References Cited

U.S. PATENT DOCUMENTS

| | | | |
|---|---|---|---|
| 5,465,354 A | 11/1995 | Hirsawa et al. | 718/106 |
| 5,473,773 A | 12/1995 | Aman et al. | 718/104 |
| 5,881,238 A | 3/1999 | Aman et al. | 709/226 |
| 5,937,388 A | 8/1999 | Davis et al. | 705/8 |
| 5,996,075 A | 11/1999 | Matena | 726/10 |
| 6,041,306 A | 3/2000 | Du et al. | 705/8 |
| 6,345,041 B1 | 2/2002 | Kimball et al. | 370/235 |
| 6,393,455 B1 | 5/2002 | Eilert et al. | 718/105 |
| 6,430,667 B1 | 8/2002 | Loen | 711/202 |
| 6,591,262 B1 | 7/2003 | MacLellan et al. | 707/2 |
| 6,643,774 B1 | 11/2003 | McGarvey | 713/155 |
| 6,665,716 B1 | 12/2003 | Hirata et al. | 709/224 |
| 6,895,573 B2 | 5/2005 | Nørgaard et al. | 717/100 |
| 6,993,576 B1 * | 1/2006 | Labedz et al. | 709/223 |
| 7,140,018 B1 | 11/2006 | Beatty et al. | 718/102 |
| 7,370,282 B2 | 5/2008 | Cary | 715/772 |
| 8,255,422 B2 | 8/2012 | Corbea | |
| 2002/0152106 A1 | 10/2002 | Stoxen et al. | 705/8 |

(Continued)

OTHER PUBLICATIONS

R. L. Haskin et al.; "The Tiger Shark File System"; 6 pgs.

(Continued)

*Primary Examiner* — Robert Timblin

(74) *Attorney, Agent, or Firm* — Merchant & Gould

(57) ABSTRACT

The present invention provides a highly reliable and scalable architecture for data centers. Work to be performed is divided into discrete work units. The work units are maintained in a pool of work units that may be processed by any number of different servers. A server may extract an eligible work unit and attempt to process it. If the processing of the work unit succeeds, the work unit is tagged as executed and becomes ineligible for other servers. If the server fails to execute the work unit for some reason, the work unit becomes eligible again and another server may extract and execute it. A server extracts and executes work units when they have available resources. This leads to the automatic load balancing of the data center.

20 Claims, 8 Drawing Sheets

(56) References Cited

U.S. PATENT DOCUMENTS

| | | | |
|---|---|---|---|
| 2002/0184518 A1* | 12/2002 | Foster et al. | 713/200 |
| 2003/0018913 A1 | 1/2003 | Brezak | 713/201 |
| 2003/0023610 A1 | 1/2003 | Bove et al. | 707/101 |
| 2003/0088534 A1* | 5/2003 | Kalantar et al. | 706/50 |
| 2003/0149668 A1 | 8/2003 | Lee et al. | 705/51 |
| 2004/0034856 A1* | 2/2004 | Boudnik et al. | 718/103 |
| 2004/0111284 A1 | 6/2004 | Uijttenbroek | 705/1 |
| 2004/0163073 A1 | 8/2004 | Krzyzanowski et al. | 717/107 |
| 2004/0199633 A1 | 10/2004 | Pearson | 709/226 |
| 2004/0210890 A1 | 10/2004 | Armstrong et al. | 717/168 |
| 2004/0216002 A1 | 10/2004 | Fromherz et al. | 714/25 |
| 2005/0033598 A1 | 2/2005 | Knapp et al. | 705/1 |

OTHER PUBLICATIONS

C. Hui et al.; "Balance—A Flexible Parallel Load Balancing System for Heterogeneous Computing Systems and Networks"; Technical Report HKUST-CS95-42, Sep. 8, 1995; pp. 1-34.

M. Cermele et al.; "Adaptive Load Balancing of Distributed SPMD Computations: A Transparent Approach"; Mar. 20, 1997; pp. 1-25.

* cited by examiner ing unit 102 and system memory 104. Depending on the exact

HIGHLY RELIABLE AND SCALABLE ARCHITECTURE FOR DATA CENTERS

RELATED APPLICATION

This application is a continuation of and claims priority under 35 U.S.C. §120 to application Ser. No. 10/856,498, filed May 28, 2004, entitled HIGHLY RELIABLE AND SCALABLE ARCHITECTURE FOR DATA CENTERS, indicated to be issued as U.S. Pat. No. 8,255,422, on Aug. 28, 2012, which is hereby incorporated by reference in its entirety.

BACKGROUND OF THE INVENTION

Mobile electronic devices, such as cell phones, wireless PDAs, wireless laptops and other mobile communication devices are making impressive inroads with consumers. Many of the mobile electronic devices are able to perform a variety of tasks and receive information from many different sources. For example, some mobile devices receive email, instant messages, web content, and other content. Before the content is delivered to the devices it may have to be processed to meets the requirements of the applications residing on the device. Many of the businesses that provide this content rely on data centers to provide the content in a reliable fashion. Failure to provide the content in a reliable and efficient manner may result in problems for the business.

SUMMARY OF THE INVENTION

The present invention is directed at providing a highly reliable and scalable architecture for data centers.

According to one aspect of the invention, discrete tasks are divided into work units. Generally, a work unit is an independent unit of action that may be completed independently from other work units. The work units are maintained in a pool of work units that may be processed by any available server.

According to another aspect of the invention, any one of a number of servers running may extract an eligible work unit and attempt to process it. If the processing of the work unit succeeds, the work unit is tagged as executed and becomes ineligible for other servers. If the server fails to execute the work unit for some reason, the work unit becomes eligible again and another server may extract and execute it.

According to yet another aspect of the invention, a server extracts and executes work units when they have available resources. For example, the available resources may be measured using such statistics as CPU load, available memory, number of threads running, and the like. A server will not extract a work unit once it exceeds a predetermined threshold. This leads to the automatic load balancing of the data center.

A more complete appreciation of the present invention and its improvements can be obtained by reference to the accompanying drawings, which are briefly summarized below, to the following detailed description of illustrative embodiments of the invention, and to the appended claims.

DETAILED DESCRIPTION OF THE PREFERRED EMBODIMENT

The present invention relates to providing a highly reliable and scalable architecture for data centers. When a server has available capacity to process a work unit, the server attempts to extract an eligible work unit from a pool of available work units and then attempts to process it. If the processing of the work unit succeeds, the work unit is tagged as executed and becomes ineligible for other servers. If the server fails to execute the work unit, the work unit becomes eligible again and another server may extract and execute it.

Illustrative Operating Environment

Figure 1:
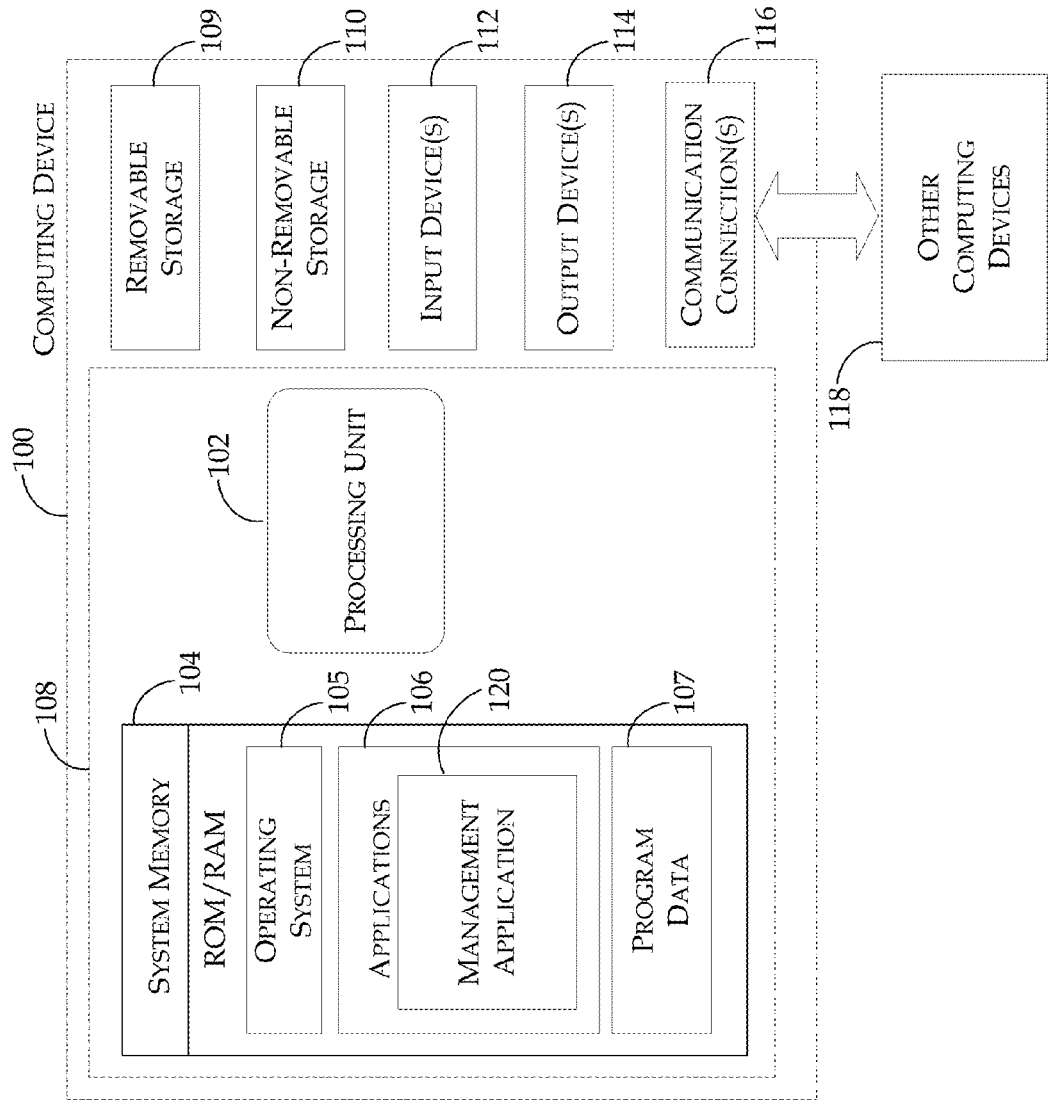
FIG. 1 illustrates an exemplary computing device.

With reference to FIG. 1, one exemplary system for implementing the invention includes a computing device, such as computing device 100. Computing device may be configured as a client, a server, mobile device, or any other computing device that is part of the system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 includes a management application 120. Generally, management application is configured to determine the available resources on the computing device and manage the processing of work units on the machine (See FIGURES and related discussion below). This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative System for Processing Work Units

Figure 2:
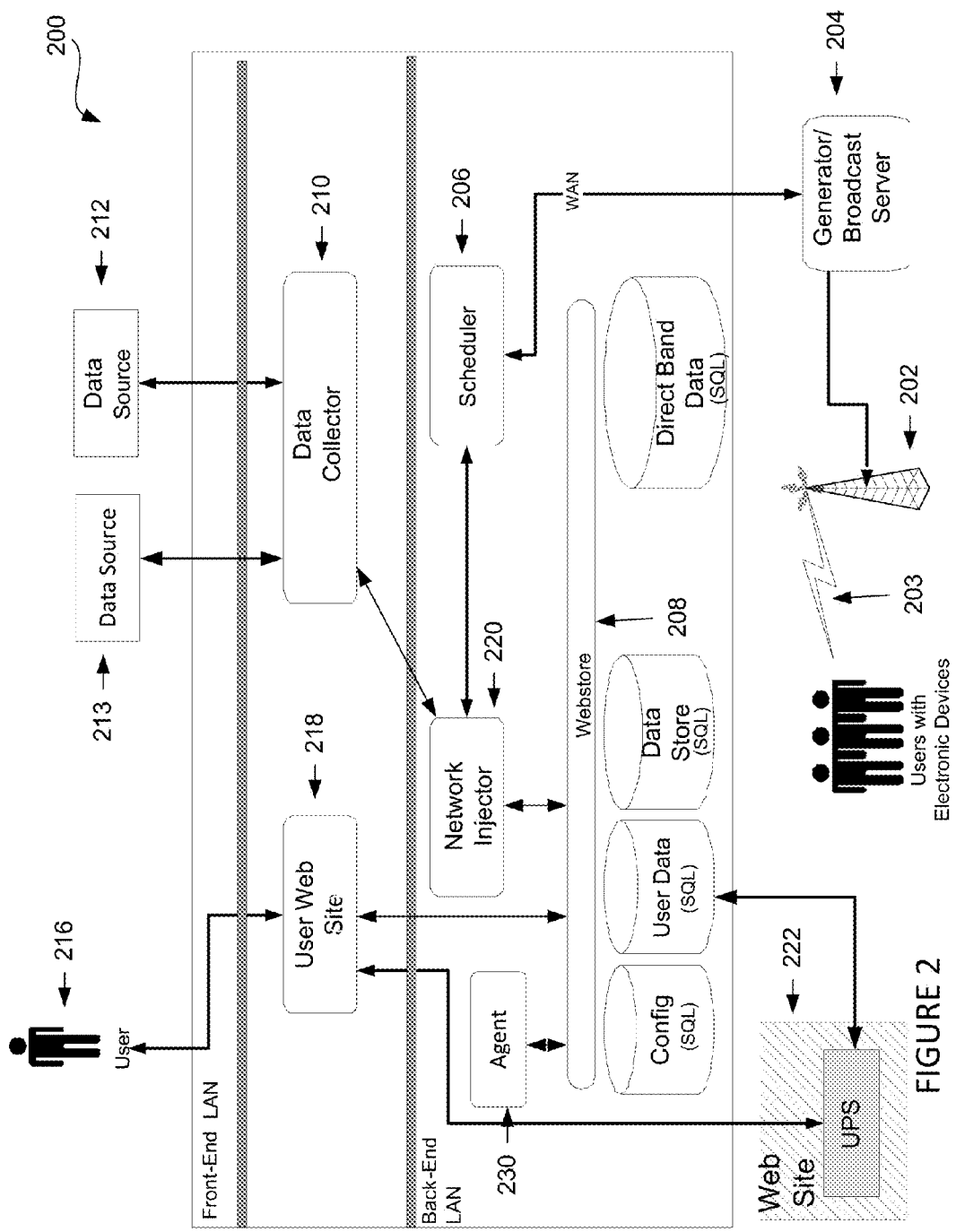
FIG. 2 illustrates a system for processing work units and broadcasting data to electronic devices.

FIG. 2 illustrates system for processing work units and broadcasting data to electronic devices, in accordance with aspects of the invention.

As illustrated, system 200 includes a broadcast tower (FM transceiver) 202 that broadcasts signals over communication channel 203 to various electronic devices. Example electronic devices that have an FM receiver or transceiver may include a desktop computer, a watch, a portable computer, a wireless cellular telephone (cell phone), and a personal data assistant (PDA). The electronic devices are arranged to receive information from the FM broadcast. The FM broadcast may be any number of types including but not limited to: a standard FM transmission, a sub-carrier FM transmission, or any other type of FM transmission as may be desired. Other means of communicating with the wireless devices may also be used. Each of the electronic devices receives messages/information over the communication channel.

The electronic devices receive message packets according to shared and private messages that are directed to the device. Message packets are organized in groups according to logical slot (or channel) entry numbers. For example, a particular electronic device is configured to receive a selected group of channels from the available channels. The message packets associated with each of those channels is received, processed, and stored in the client device. Example channels that are broadcast to the devices include: a time channel, a messages channel, a calendar channel, a weather channel, a stocks channel, a news channel, and a movies channel. Messages associated with each channel include message content that is based on the particulars of the channel. For example, a news channel may include a listing of news stories that are currently considered breaking news.

A user 216 may customize the channels they receive through user web site 218. Using website 218 the user may set options and select information associated with channels to which they have subscribed. For example, the user may select the news sources which are used to gather data for their electronic device. The selected options are stored in a data store, such as webstore 208. Channel information and various options may also be automatically retrieved from a web site to which the user participates in. For example, web site 222 may be the user's home page in which the user has already selected various options customizing their page. These options may be used to populate the options associated with various channels. For example, a user's selected cities may be used in a weather channel, the user's selected theaters may be used in a movies channel, a user's selected stocks they desire to track may be used in a stock channel, and the like.

Data Collector 210 is configured to collect data from one or more data sources, such as from data source 212 and data source 213, relating to a channel. For example data collector 210 may be configured to retrieve headline news from data source 212, and sports news from data source 213. Generally data sources are used to provide data relating to the various channels that are provided. For example, there are data sources for news information, weather information, movie information, sports information, and the like.

Data collector 210 may store the data in a data store, such as webstore 208, for later broadcast. According to one embodiment, data store 210 communicates with network injector 220 which then stores the data in webstore 208.

Generally, data collector 212 is configured as a set of servers that can process work units independently from one another. When one server fails, the other servers within the data collector execute the work units that have not been completed. (See FIGURES and discussion below for more details).

Broadcast transmitter tower 202 is arranged to provide a communication signal that is configured for reception by users with electronic devices that are located within a service region. Broadcast tower 202 transmits in response to generator/broadcast server 204. Generator 204 may communicate with scheduler 206 via a network communication link. Scheduler 206 is configured to package and schedule broadcast transmissions relating to channel information. Scheduler 206 may also be configured as a set of servers processing work units as described below.

Selected services are entered in a database, such as webstore 208 for broadcast transmission at a later time. At the designated time (or time interval) scheduler 206 communicates with broadcast server 204 to begin a transmission sequence of data for the selected services. Broadcast server 204 formats the data for reception by one or more wireless client device, queues the data for transmission, and communicates the queued data to FM broadcast tower 202 for transmission. In an alternative example, scheduler 206 communicates the selected services to the broadcast server. The broadcast server schedules the time interval for transmission of the selected service.

Each broadcast transmission corresponds to the transmission of one or more frames that are arranged in accordance with a frame protocol. Each frame may include multiple messages, where some messages are public broadcast (aka "global" or "shared" messages), while other messages are client specific messages (aka "personal" or "private" messages). Each frame includes a table of contents that indicates the extent of messages that are found within the next transmitted frame. Every client that is located within the designated service region receives the shared and personal messages. Personal messages, however, may only be decoded by a single client.

Each frame includes a header, a table of contents, and a message payload that includes the content for one or more selected services as previously described. The header also includes other information such as authentication data, identified service region, language, available stations for the identified service region, frame number, and time stamp. Control information may also be included in one of the headers to indicate broadcast conditions such as a change in available channels, an assignment of a service region to a particular wireless client device, and an assignment of a particular channel (frequency). In one example, each frame includes a change counter in one of the headers to indicate a change has taken place in the system. Wireless client devices (clients) may use the change counter to determine when to initiate a failover (when a broadcast tower becomes unavailable).

Client devices can determine the current service region based on information that is included in the broadcast transmissions. The time zone can be determined based on the current service region such that the client device can adjust any time related information. Moreover, the time and date functions of the client device may be synchronized based on information that is included in the broadcast transmissions.

Agent 230 is configured to perform maintenance functions. For example, agent 230 is configured to remove data that is not needed any longer from one of the databases. According to one embodiment, agent 230 is configured as a set of servers processing work units (See below).

Figure 3:
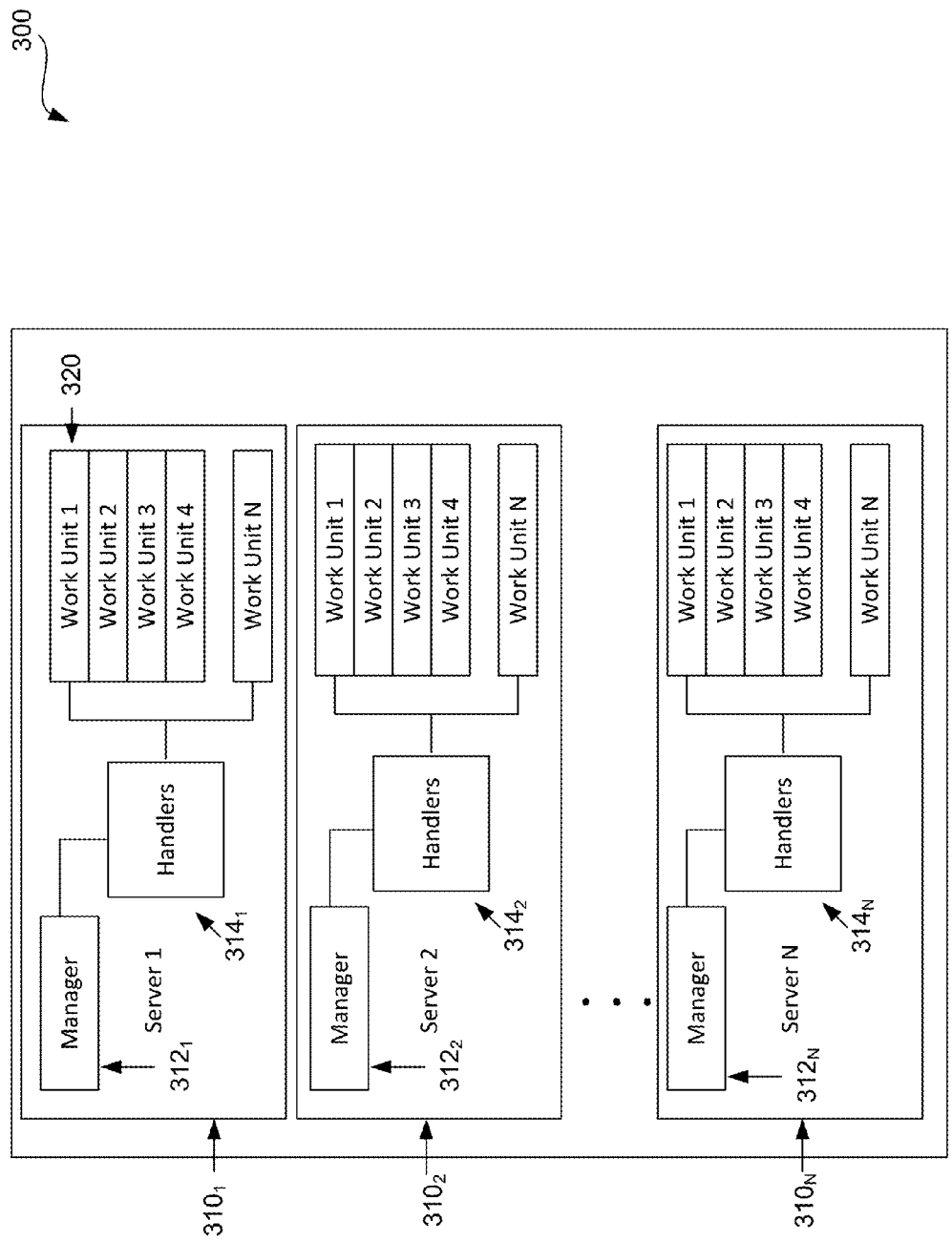
FIG. 3 illustrates servers processing available work units.

FIG. 3 illustrates servers processing available work units, in accordance with aspects of the invention. As displayed, each server includes a manager and handlers for processing work units.

According to one embodiment, scalable work unit processor 300 is configured to act as a data collector, scheduler, or agent as shown in FIG. 2. As shown, each of the servers ($310_{1-N}$) includes a manager ($312_{1-N}$) and handlers $314_{1-N}$.

The manager is responsible for managing the handlers and determining available resources for the server. When a server is started, the manager loads the handlers stored on the server. The types of handlers available on a server may change depending on the work the handlers are to perform. For example, a data collector will have data collection handlers, whereas a scheduler will have scheduling handlers. According to one embodiment, each handler is configured to process specific types of work units. For instance, a stock collection handler does not process work units intended for the scheduler. There is generally at least one handler for each designated channel. There may be many different types of channels: including: a stocks channel, a news channel, a sports channel, and the like.

The handler obtains a work unit and starts processing the work unit. If successful, the handler writes to data store stating that it has finished processing the work unit. If the handler needs more time to process the work unit, then it requests that new checkpoint time be set. The manager may then use this information to update the work unit.

The manager is also configured to determine its available resources for processing work units. Each server ($310_{1-N}$) is configured to execute as many work units (320) as its resources allow. According to one embodiment, the manager determines the CPU load, available memory, and number of threads running on the server. Other resources may also be monitored to determine the available resources on the server. When the server has resources available to process a work unit the manager requests a work unit from a pool of available work units. Once the work unit is obtained, the manager dispatches the work unit to the appropriate handler for processing. The manager can also keep track of the time and resources used by each of the handlers and can abort a work unit if the handler consumes too many resources or is deadlocked.

When a server determines that it has reached its predetermined resource limit, it goes into a state where no more work units are accepted. This helps to ensure that a server does not take on too much load. If a server's resources become critically constrained, the server may enter a critical state where it may abandon work units that it is currently processing. Work units that are not completed by one server may be taken and processed by another one of the available servers. For example, if server $310_1$ fails, then one of the other servers ($310_{2-N}$) can process the work units. If server $310_1$ did not completely fail, but processing of the work unit failed, then server $310_1$, or any of the other servers ($310_{2-N}$) could be used to process the work unit again. If no servers have available resources then a server(s) may be added to handle the extra load.

The number of servers used to process work units may be calculated by the formula: N=F+x, where F is the number of machines needed to process all of the work units at full load, and x is the estimated number of machines that can fail simultaneously.

Figure 4:
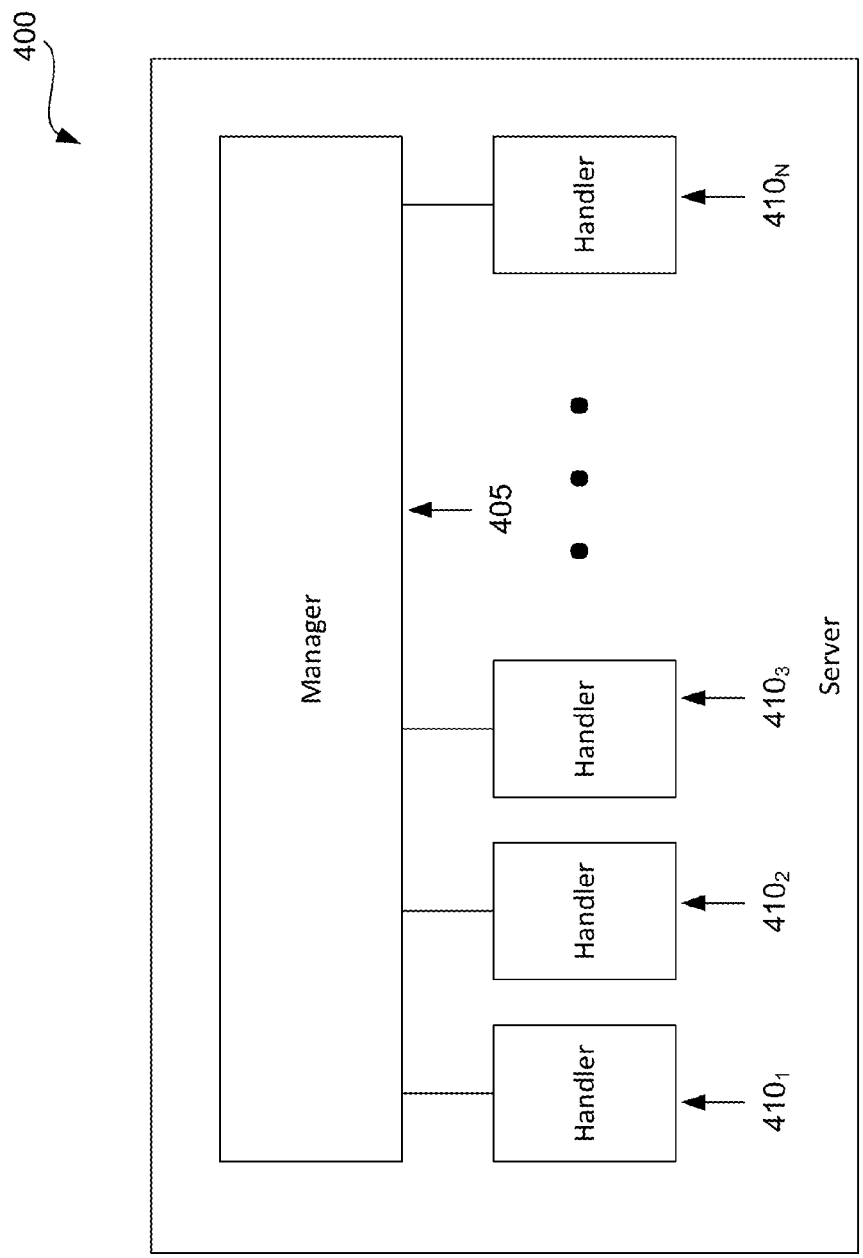
FIG. 4 shows a more detailed view of the manager and handlers.

FIG. 4 shows a more detailed view of the manager and handlers, in accordance with aspects of the invention. As shown, server 400 includes a manager 405 and individual handlers $410_{1-N}$. According to one embodiment, each handler is configured to process a particular type of work unit. For example, hander $410_1$ may be configured to collect data relating to stock prices; handler $410_2$ may be configured to collect movie theater names; and so on. According to one embodiment, handlers $410_{1-N}$ are implemented as dynamic link libraries.

Figure 5:
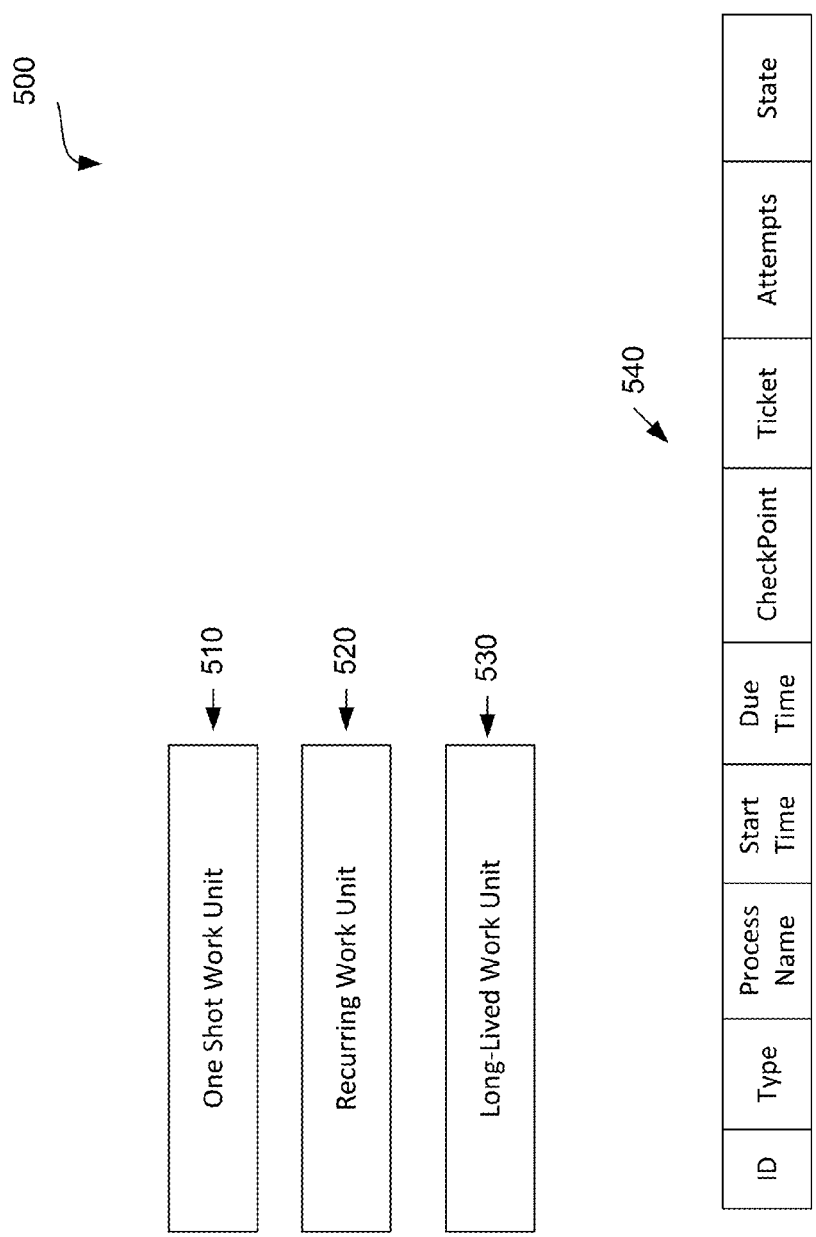
FIG. 5 shows exemplary work units and a work unit structure.

FIG. 5 shows exemplary work units and a work unit structure 500, in accordance with aspects of the invention. According to one embodiment, there are three different types of work units: one shot work units; recurring work units; and long-lived work units.

One short work units (510) are work units that are executed one time by the system. For example, a one short work unit may be used to add a new subscriber to the system or remove a subscriber. Once a one-shot work unit is completed it disappears from the pool of available work units.

Recurring work units (520) are work units that recur at a predetermined frequency. For example, a recurring work unit may recur every 1 minute, 10 minutes, each day, month, and the like. Once a recurring work unit is completed a new recurring work unit is automatically created and placed within the pool of available work units.

Long-lived work units (530) are work units that are attempted to be maintained on a single server since it may be computationally expensive to switch a work unit between different machines. For example, a work unit that creates frames for stations may be a long-lived work unit. If frame 5 was allowed to switch between different servers then any of the state information stored in the server relating to frame 5 would not be available on the different server. Additionally, all of the messages for the state would have to be loaded and cached again.

Each work unit includes fields 540. According to one embodiment, work unit 440 includes an ID, a type, a name, a start time, a due time, a checkpoint time, a ticket, a number of attempts, and a state. According to another embodiment, a work unit may include a start time, a retry time, a due time, a status, and an attempts field.

The ID uniquely identifies the particular work unit. The type of work unit refers to the type of handler that can process the work unit. According to one embodiment, different handlers process different types of work units. For example, a weather handler processes weather work units, a stocks handler processes stock work units, and the like. Work units of different types may reside in the same database, or be stored in separate databases.

The start time refers to the time the work unit should be processed. The due time is the time the work unit should be finished processing. The checkpoint time is a time that is set when a work unit is dispatched to be processed. The checkpoint time provides a time marker that if the work unit is not completed by the checkpoint time it may become an available work unit which another server may process.

A server may also update the checkpoint time when it needs more time to complete the work unit. A long-lived work unit may also be created by continually updating the checkpoint time.

Generally, a work unit is eligible for processing by a server when the time is between the start time and due time. When the time is between the start and due times, the checkpoint time is checked to determine if it has not already been released for processing. If the work unit has already been released then the work unit becomes available after the checkpoint time has passed but the current time is still before the due time.

Each time a work unit is released for processing a ticket is generated that uniquely identifies the work unit. In order to perform operations on the work unit, such as updating the checkpoint time or changing its state, the server performing the operation must know the ticket contained within the work unit. According to one embodiment, the ticket is a random number that is generated when the work unit is released to a server to be processed.

An attempts field is used to help detect any "poison pills." A poison pill is a work unit that can not be processed. Some poison pills could cause havoc on a system if not stopped in a timely manner. Each time a work unit is attempted to be processed the attempts field is incremented by one. According to one embodiment, when a work unit has been attempted to be processed three times, the work unit will not be attempted again. The attempts field is reset when the work unit state changes.

The state field is used to store any state information associated with the work unit. This way the intermediary results can be obtained without having to restart the entire work unit. For example, if a work unit is created to obtain 200 stock quotes and 100 stock quotes have been processed, then the state field will indicate the completion of 100 stock quotes. If the work unit fails before completing, a server may examine the state field and start processing the second 100 stock quotes since the first 100 quotes have already been completed.

As mentioned above, a work unit may be completed in more than one step. As processing progresses, the checkpoint time can be continually updated. When the first step is finished, the checkpoint time is updated which extends the period of non-eligibility for that work unit. In other words, the work unit may not be taken and processed by another server.

Figure 6:
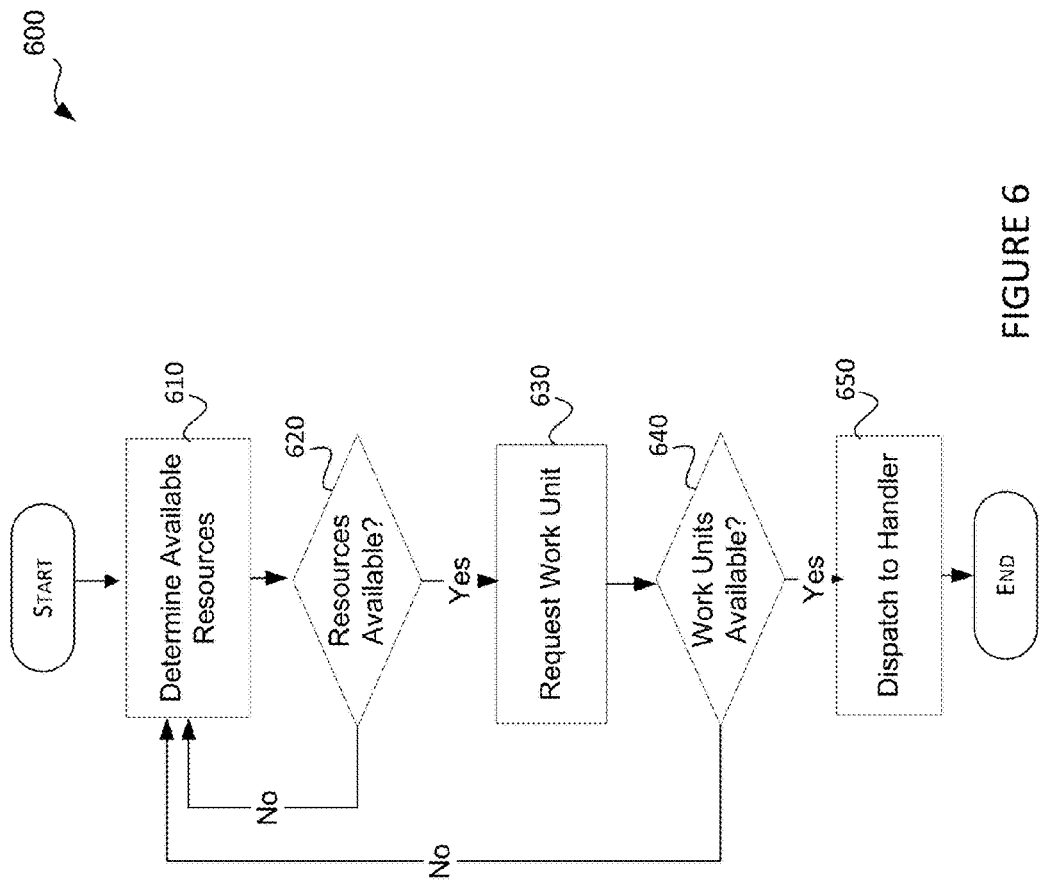
FIG. 6 illustrates processing work units.

FIG. 6 illustrates processing work units 600, in accordance with aspects of the invention. After a start block, the process flows to block 610 where the resources of the server are determined. According to one embodiment, the framework determines the current CPU load, memory usage, and number of threads running According to another embodiment, the number of work units is limited to a predetermined number of work units per server. For example, a server may be limited to 16 work units at any one time.

Transitioning to decision block 620, a determination is made as to whether the server has capacity to process more work units. When capacity is not available, the process returns to block 610. When capacity is available, the process moves to block 630 where a work unit is requested.

The process returns to block 610 when a work unit is not available from a pool of available work units. When a work unit is available 640, the process flows to block 650 where the work unit is obtained and dispatched to the appropriate handler. The process then moves to an end block and returns to processing other actions.

Figure 7:
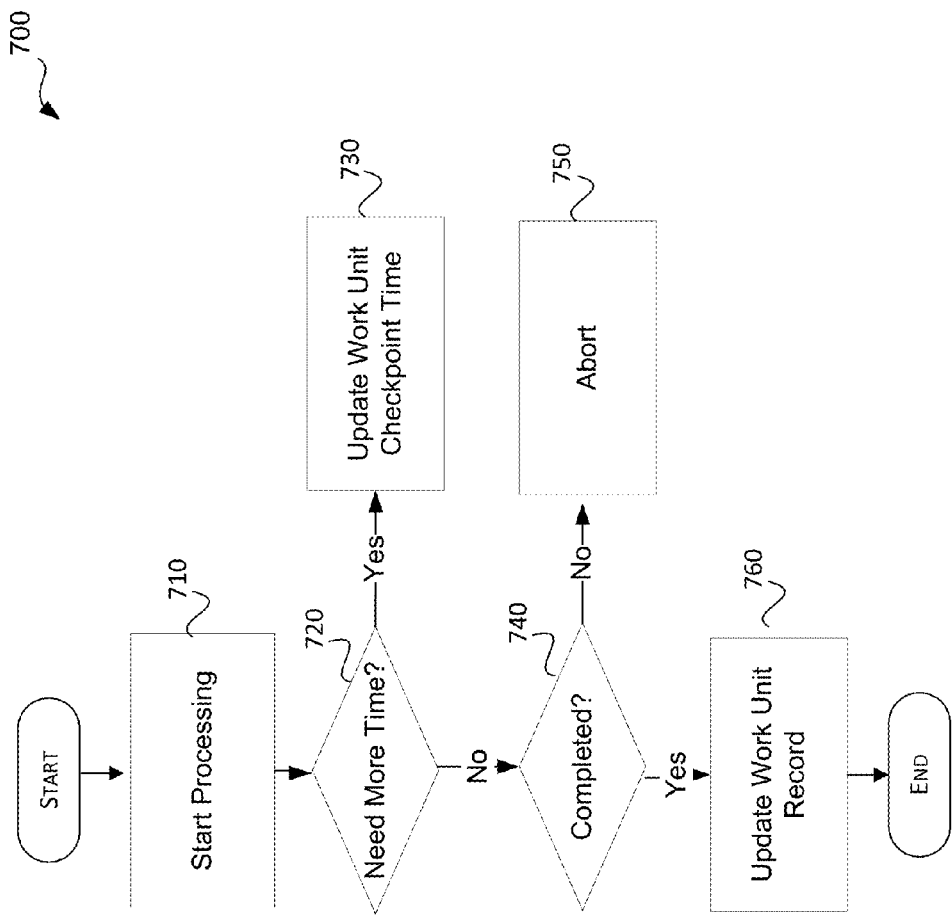
FIG. 7 shows a process flow for a handler processing a work unit.

FIG. 7 shows a process flow for a handler processing a work unit 700 in accordance with aspects of the present invention. After a start block, the process flows to block 710 where processing of the work unit is started. Moving to decision block 720 a determination is made as to whether more time is needed to process the work unit. When more time is needed, the process moves to block 730 where the checkpoint time is updated with a new checkpoint time that provides the handler with more time to process the work unit.

When more time is not needed, the process flows to decision lock 740 where a determination is made as to whether or not the work unit has completed processing. When the work unit has not completed processing, the process moves to block 750 where the process aborts. When processing is completed, the work unit state is updated to indicate that the work item has completed processing 760. The process then moves to an end block and returns to processing other actions.

Figure 8:
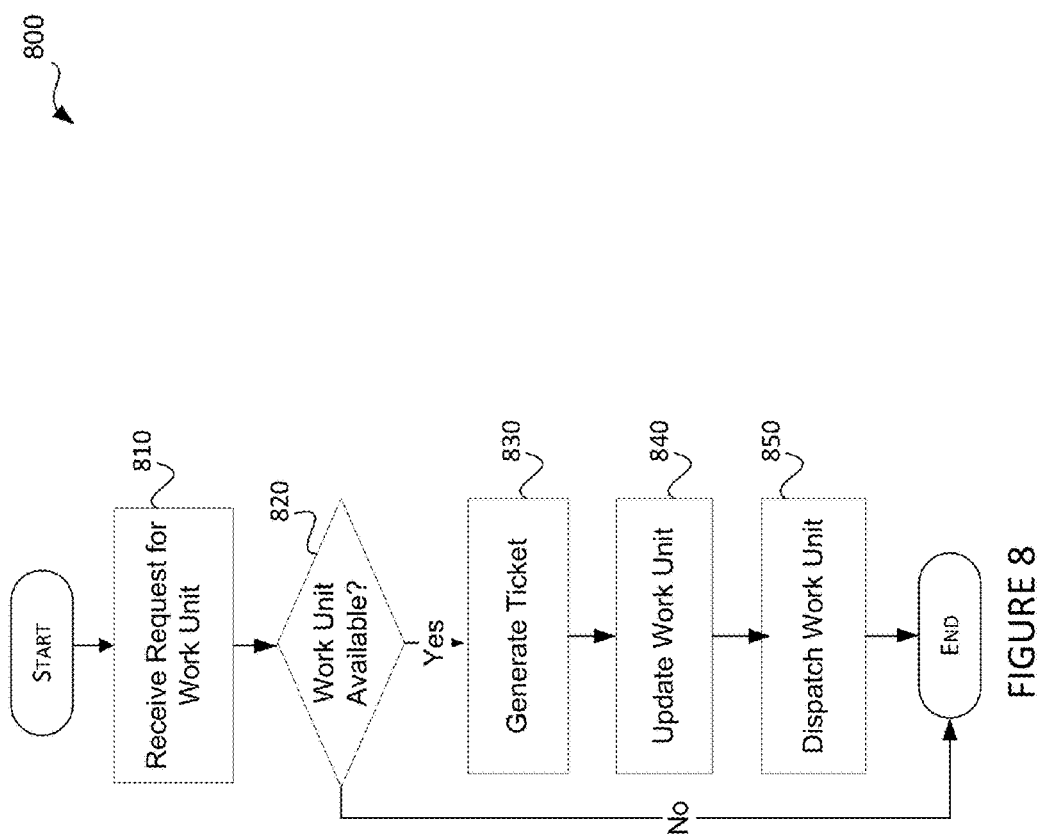
FIG. 8 illustrates processing a request for a work unit, in accordance with aspects of the present invention.

FIG. 8 illustrates processing a request for a work unit 800 in accordance with aspects of the invention. After a start block, the process moves to block 810 where a request for a work unit is received. Moving to decision block 820, a determination is made as to whether there is a work unit available. According to one embodiment, a pool of available work units is maintained in a data store, such as a SQL database. When a work unit is not available, the process flows to an end block. When a work unit is available, the process moves to block 830 where a work unit is obtained and a ticket is generated. The ticket is a unique identifier that is used when updating the work unit. Fields within the work unit are not updated unless the ticket provided matches the ticket within the ticket field of the work unit. According to one embodiment, any work order awaiting processing may be obtained. In other words, no priority is assigned to the work units. Moving to block 840, the work unit fields are updated. According to one embodiment, the checkpoint time is updated, the number of attempts is updated, and the state information may be updated. The process then transitions to block 850 where the work unit is dispatched to the handler for processing. The process then steps to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system for providing a highly reliable and scalable architecture for data centers, comprising:
   a pool of work units that combine to form a discrete task and are located on a central data store, wherein each of the work units in the pool is marked as eligible or ineligible for processing may be processed and completed independently from the other work units in the pool;
   servers that each comprise a processor and a computer-readable storage medium including computer executable instructions executing on the processor, wherein each server of the servers is configured to:
   load a handler for processing a work unit;
   determine available resources on the server;
      request any available work unit from the pool of work units that can be processed by the loaded handler when the server has available resources;
   in response to determining the work unit is to be processed, generating a ticket that uniquely identifies the work unit that is provided to the server for use in authenticating the server before allowing the server to update to the work unit;
   dispatch the obtained work unit to the loaded handler for processing;
   process the obtained work unit; and
   mark the dispatched work unit as completed when the obtained work unit has been completely processed and when the obtained work unit has not been completely processed marking the obtained work unit as eligible for processing within the pool of work units such that the eligible work unit is automatically re-dispatched from the pool of work units when requested.

2. The system of claim 1, wherein each server is configured to determine its available resources, further comprises determining the following resources: CPU load; available memory; number of threads running; and number of work units being processed.

3. The system of claim 1, wherein each work unit includes a time field which indicates when the work unit is eligible for processing.

4. The system of claim 3, wherein the time field further comprises a start time and a due time; wherein the start time indicates the time the work unit should be started to be processed; and wherein the due time indicates the time the work unit should be completed.

5. The system of claim 1, wherein a time field is only updatable by a server holding the ticket that matches the work unit.

6. The system of claim 1, wherein each work unit further includes a ticket field that is a random number that is also included within the ticket that is provided to the server.

7. The system of claim 1, wherein each work unit further includes a state field indicating the amount of completion of the work unit.

8. A method for providing a highly reliable and scalable architecture for data centers, comprising:
   determining available resources on a server;
   requesting any eligible work unit from a pool of work units when the server has available resources, wherein the pool of work units combine to form a discrete task and are located on a central data store, wherein each of the work units in the pool is marked as eligible or ineligible for processing may be processed and completed independently from the other work units in the pool;
   obtaining the eligible work unit from the pool of work units and marking the eligible work unit as ineligible for processing within the pool of work units;
   determining whether the work unit is to be processed; and
   in response to determining the work unit is to be processed, generating a ticket that uniquely identifies the work unit that is provided to the server that is used to authenticate the server before updating the work unit, processing the obtained work unit and marking the obtained work unit as completed when the processing of the obtained work unit completed and when the processing of the obtained work unit failed, marking the work unit as eligible within the pool of work units such that the work unit is obtained from the pool of work units when requested.

9. The method of claim 8, further comprising maintaining a time field for each of the work units; wherein the time field comprises a start time, a due time and a checkpoint time; wherein the start time indicates the start time a work unit is eligible for processing; wherein the due time indicates when the work unit is ineligible for processing; and wherein the checkpoint time is a time between the start time and the due time that indicates when the work unit is ineligible for processing by other servers.

10. The method of claim 8, wherein determining the available resources, further comprises determining the following resources on the server: CPU load; available memory; number of threads running; and number of work units being processed.

11. The method of claim 8, further comprising maintaining a state field within the work unit that indicates a current state of the work unit such that the work unit where processing failed may be continued from the current state.

12. The method of claim 9, wherein the checkpoint time may be updated such that the work unit does not become eligible for processing for an additional period of time.

13. The method of claim 8, further comprising generating a random number that is stored in the ticket and a ticket field of the work unit.

14. The method of claim 9, further comprising updating the checkpoint time if the work unit is being processed when the checkpoint time is reached.

15. A computer-readable memory, encoded with computer executable instructions for providing a highly reliable and scalable architecture for data centers, comprising:
   determining available resources on a server; requesting any eligible work unit from a pool of work units when the server has available resources, wherein the pool of work units combine to form a discrete task and are located on a central data store, wherein each of the work units in the pool is marked as eligible or ineligible for processing may be processed and completed independently from the other work units in the pool;
   obtaining the eligible work unit from the pool of work units and marking the eligible work unit as ineligible for processing within the pool of work units;
   determining whether the work unit is to be processed;
   and in response to determining the work unit is to be processed, generating a ticket that uniquely identifies the work unit that is provided to the server that is used to authenticate the server before updating the work unit, processing the obtained work unit and marking the obtained work unit as completed when the processing of the obtained work unit completed and when the processing of the obtained work unit failed, marking the work unit as eligible within the pool of work units such that the work unit is obtained from the pool of work units when requested.

16. The computer-readable memory of claim 15, further comprising maintaining a time field for each of the work units; wherein the time field comprises a start time, a due time and a checkpoint time; wherein the start time indicates the start time a work unit is eligible for processing; wherein the due time indicates when the work unit is ineligible for processing; and wherein the checkpoint time is a time between the start time and the due time that indicates when the work unit is ineligible for processing by other servers.

17. The computer-readable memory of claim 15, wherein determining the available resources, further comprises determining the following resources on the server: CPU load; available memory; number of threads running; and number of work units being processed.

18. The computer-readable memory of claim 15, further comprising maintaining a state field within the work unit that indicates a current state of the work unit such that the work unit where processing failed may be continued from the current state.

19. The computer-readable memory of claim 15, further comprising generating a random number that is stored in the ticket and a ticket field of the work unit.

20. The computer-readable memory of claim 16, further comprising updating the checkpoint time if the work unit is being processed when the checkpoint time is reached.

* * * * *